US008469601B2

(12) United States Patent
Tamada et al.

(10) Patent No.: US 8,469,601 B2
(45) Date of Patent: Jun. 25, 2013

(54) CARTRIDGE INSTALLING UNIT AND IMAGE RECORDING APPARATUS

(75) Inventors: Hisashi Tamada, Nagoya (JP); Keiji Kura, Nagoya (JP); Yusuke Suzuki, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 206 days.

(21) Appl. No.: 12/979,798

(22) Filed: Dec. 28, 2010

(65) Prior Publication Data

US 2011/0188884 A1 Aug. 4, 2011

(30) Foreign Application Priority Data

Jan. 29, 2010 (JP) ................................ 2010-017975

(51) Int. Cl.
*G02B 6/36* (2006.01)

(52) U.S. Cl.
USPC ................................ 385/53; 385/55; 439/320

(58) Field of Classification Search
USPC ................................ 347/85–91; 399/107–110
See application file for complete search history.

(56) References Cited

U.S. PATENT DOCUMENTS

2004/0021737 A1 2/2004 Harada et al.
2005/0036015 A1 2/2005 Seino et al.
2005/0052511 A1 3/2005 Seino et al.
2005/0068382 A1 3/2005 Kimura et al.
2005/0116998 A1 6/2005 Harada et al.
2005/0185036 A1* 8/2005 Seino et al. .................... 347/86
2005/0248637 A1 11/2005 Seino et al.
2008/0024572 A1 1/2008 Kimura et al.
2008/0143764 A1* 6/2008 Kaga et al. ....................... 347/7
2009/0167796 A1* 7/2009 Ueda ................................ 347/6

FOREIGN PATENT DOCUMENTS

JP 2006-263960 10/2006
JP 2007-269040 10/2007

* cited by examiner

*Primary Examiner* — Ellen Kim
(74) *Attorney, Agent, or Firm* — Frommer Lawrence & Haug LLP

(57) ABSTRACT

A cartridge installing unit on which a plurality of types of liquid cartridges are to be installed, includes: a plurality of cartridge installing portions on which the plurality of types of liquid cartridges are installed; a plurality of liquid infusing portions each of which corresponds to one of the plurality of types of liquid cartridges, and each of which is provided to be movable between the plurality of cartridge installing portions to communicate with corresponding liquid cartridge; and a plurality of moving mechanisms each of which moves one of the plurality of liquid infusing portions, and when a liquid cartridge among the liquid cartridges is installed on a cartridge installing portion among the cartridge installing portions, a moving mechanism among the moving mechanisms moves a liquid infusing portion corresponding to the liquid cartridge to the cartridge installing portion on which the liquid cartridge is installed.

14 Claims, 10 Drawing Sheets

CARTRIDGE INSTALLING UNIT AND IMAGE RECORDING APPARATUS

CROSS REFERENCE TO RELATED APPLICATION

The present application claims priority from Japanese Patent Application No. 2010-017975, filed on Jan. 29, 2010, the disclosure of which is incorporated herein by reference in its entirety.

BACKGROUND OF THE INVENTION

1. Field of the Invention

The present invention relates to a cartridge installing unit on which a plurality of types of liquid cartridges are to be installed and an image recording apparatus which is configured to record an image by discharging a liquid supplied from a liquid cartridge which is installed on the cartridge installing unit.

2. Description of the Related Art

A printer described in Japanese Patent Application Laid-open No. 2006-263960 is provided with four cartridge installing portions. Four ink cartridges filled with inks of four different colors respectively are installed on these four cartridge installing portions. Moreover, adaptive (fitting) identification projections are provided at mutually different positions on the four cartridge installing portions. A groove into which one of the adaptive identification projections is engaged is formed in each of the ink cartridges, at a position corresponding to the adaptive identification projection provided in the cartridge installing portion on which the cartridge is to be installed. Accordingly, each of the ink cartridges is installable only on one of the cartridge installing portions in which the adaptive identification projection corresponding to the groove of the ink cartridge has been provided, and the ink cartridge is prevented from being installed mistakenly on the cartridge installing portion other than the cartridge installing portion corresponding to the ink cartridge.

However, in a printer described in Japanese Patent Application Laid-open Publication No. 2006-263960, since the ink cartridge is installable only on the corresponding cartridge installing portion, a user is required to install the ink cartridge on the cartridge installing portion upon confirming as to on which cartridge installing portion the ink cartridge is to be installed.

SUMMARY OF THE INVENTION

An object of the present invention is to provide a cartridge installing unit in which a plurality of types of liquid cartridges are easily installable on cartridge installing portions without confirming as to on which cartridge installing portion the cartridge is to be installed.

According to an aspect of the present invention, there is provided a cartridge installing unit on which a plurality of types of liquid cartridges are to be installed, including: a plurality of cartridge installing portions on which the plurality of types of liquid cartridges are installed; a plurality of liquid infusing portions each of which corresponds to one of the plurality of types of liquid cartridges, and each of which is provided to be movable between the plurality of cartridge installing portions to communicate with corresponding liquid cartridge; and a plurality of moving mechanisms each of which moves one of the plurality of liquid infusing portions, and when a liquid cartridge among the liquid cartridges is installed on a cartridge installing portion among the cartridge installing portions, a moving mechanism among the moving mechanisms moves a liquid infusing portion corresponding to the liquid cartridge to the cartridge installing portion on which the liquid cartridge is installed.

Accordingly, even when the liquid cartridge is installed on any cartridge installing portion, since the liquid infusing portion corresponding to the liquid cartridge which has been installed moves up to the cartridge installing portion on which the liquid cartridge has been installed, it is not necessary to confirm as to on which cartridge installing portion the cartridge is to be installed, and the installing of the liquid cartridge becomes easy.

BRIEF DESCRIPTION OF THE DRAWINGS

FIG. 2A shows a state in which ink cartridges 60*a*, 60*b*, 60*c*, 60*d* (hereinafter, "ink cartridges 60*a* to 60*d*") have not been installed, and FIG. 2B shows a state in which the ink cartridges 60*a* to 60*d* have been installed;

DESCRIPTION OF THE PREFERRED EMBODIMENTS

A first embodiment which is an exemplary embodiment of the present invention will be described below. The first embodiment will be described by stipulating a frontward and rearward direction, a left-right direction, and an upward and downward direction as shown in FIG. 1.

Figure 1:
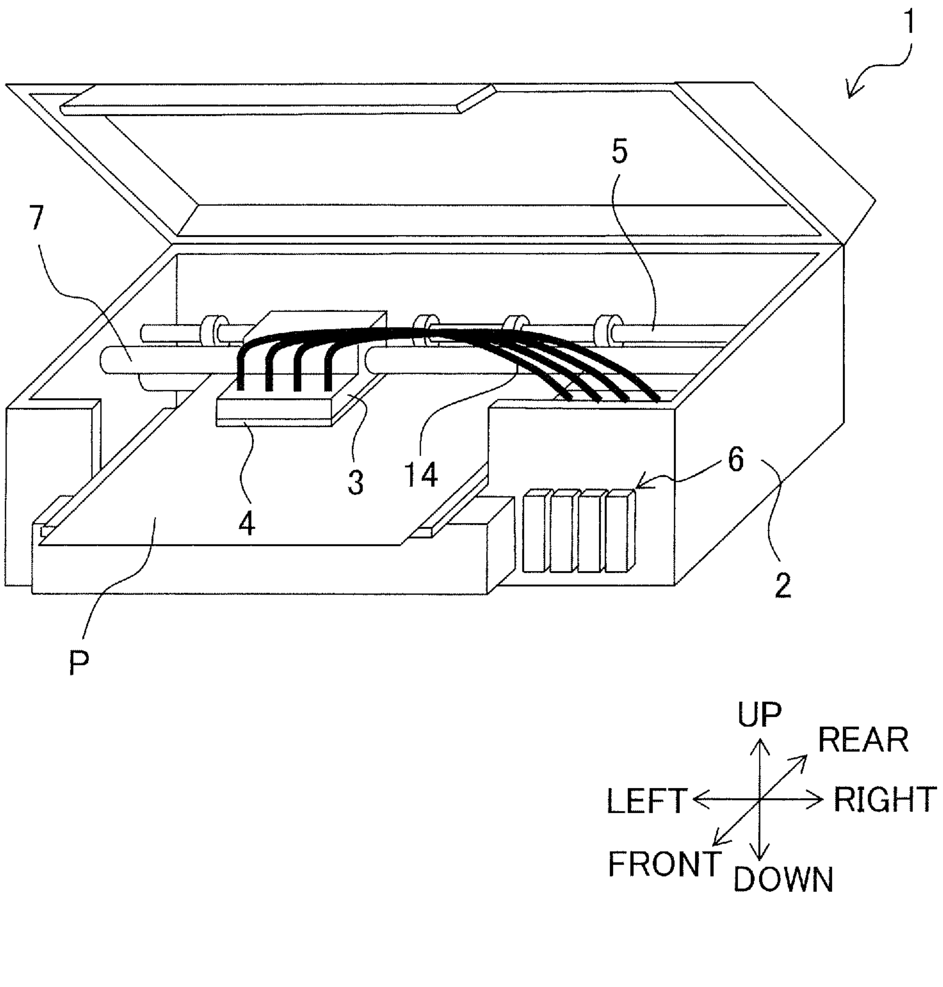
FIG. 1 is a schematic structural view of a printer according to a first embodiment.

As shown in FIG. 1, a printer 1 (image recording apparatus) has a structure in which components such as a carriage 3, an ink-jet head 4 (liquid discharge head), a paper transporting roller 5 (transporting mechanism), and a cartridge installing unit 6 are arranged inside a casing 2 having a substantially box shape.

The carriage 3 reciprocates in the left-right direction (scanning direction) along a guide shaft 7. The ink-jet head 4 is arranged on a lower surface of the carriage 3, and jets ink droplets from nozzles which are not shown in the diagram but are arranged on a lower surface of the ink-jet head 4. The paper transporting roller 5 transports a recording paper P (recording medium) frontward (in a paper feeding direction). The cartridge installing unit 6 is arranged at a front-end portion on a right side of the casing 2, and as it will be described later, ink cartridges 60*a* to 60*d* filled with inks for supplying to the ink jet head 4 are installed on the cartridge installing unit 6.

Moreover, in the printer 1, printing is carried out on the recording paper P which is transported in the paper feeding direction by the paper transporting roller 5, by jetting the inks from the ink-jet head 4 which reciprocates in the scanning direction together with the carriage 3.

Next, the cartridge installing unit 6 will be described below in detail while referring to diagrams from FIG. 2A to FIG. 5. Here, in FIG. 2B, the cartridges 60*a* to 60*d* are indicated by alternate long and two short dashes lines, and in FIG. 4B, the ink cartridges 60*a* to 60*d* are not shown.

As shown in diagrams from FIG. 2A to FIG. 5, the cartridge installing unit 6 includes four cartridge installing portions 11*a*, 11*b*, 11*c*, and 11*d* (hereinafter, "cartridge installing portions 11*a* to 11*d*"), and four ink infusing portions 12*a* to 12*d*. In the following description, when the cartridge installing portions 11*a* to 11*d* are not distinguished from each other, the cartridge installing portions 11*a* to 11*d* are referred to a cartridge installing portion 11 in some cases. Similarly, when the ink infusing portions 12*a* to 12*d* are not distinguished from each other, the ink infusing portions 12*a* to 12*d* are referred to an ink infusing portion 12 in some cases. Moreover, the same is applicable for other structures in which the components are not distinguished from each other.

The cartridge installing portions 11*a* to 11*d* are arranged in a row in the scanning direction when viewed from a front side of FIG. 1. The cartridge installing portions 11*a* to 11*d* have openings at front ends thereof and four spaces are formed in the cartridge installing portions 11*a* to 11*d*, respectively. As it will be described later, by inserting the four types of ink cartridges 60*a* to 60*d* from the openings of the front ends, the ink cartridges 60*a* to 60*d* are installed on the cartridge installing portions 11*a* to 11*d*, respectively.

Figure 2A:
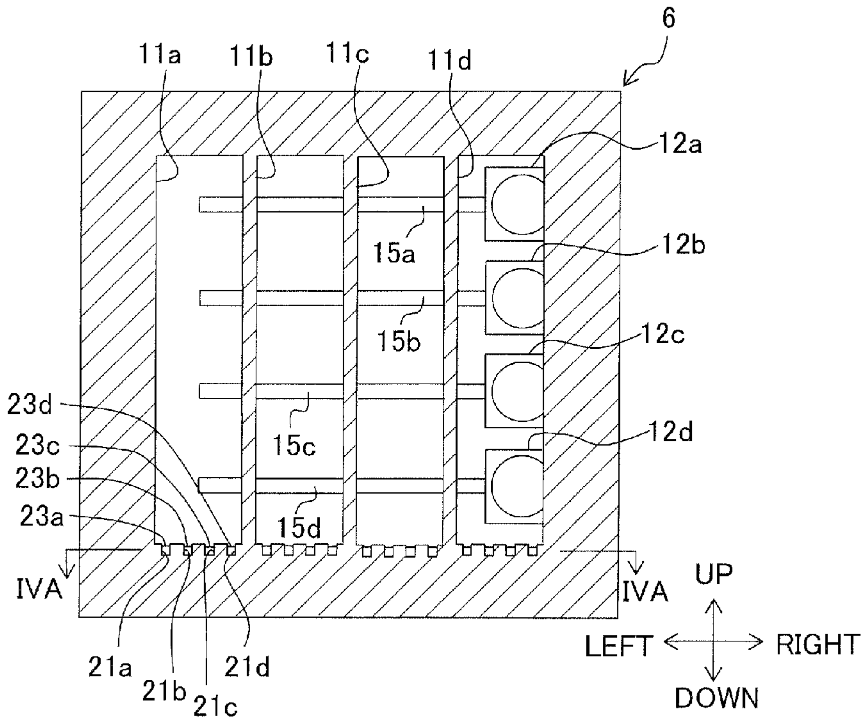
FIG. 2A and FIG. 2B are front views of a cartridge installing portion in FIG. 1, where
Figure 2B:
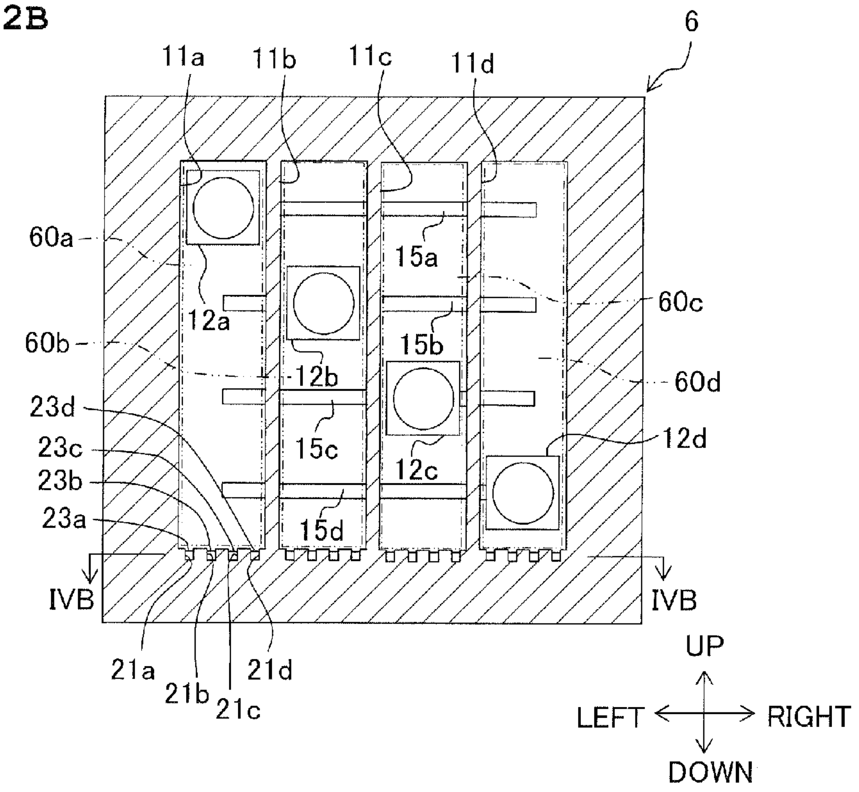
Figure 3A:
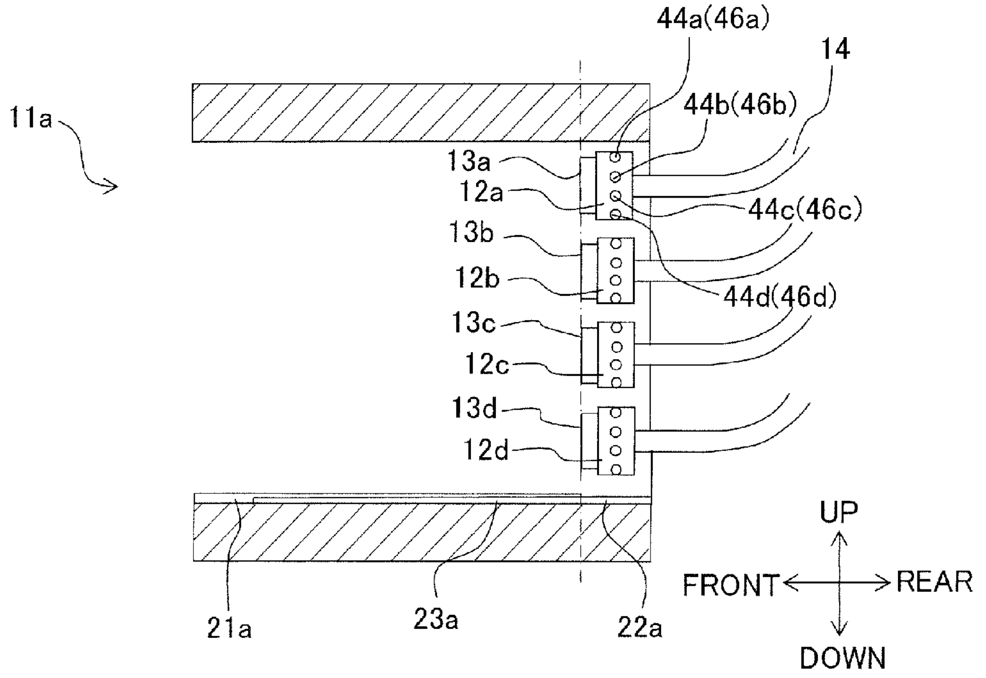
FIG. 3A is a side view corresponding to FIG. 2A.
Figure 3B:
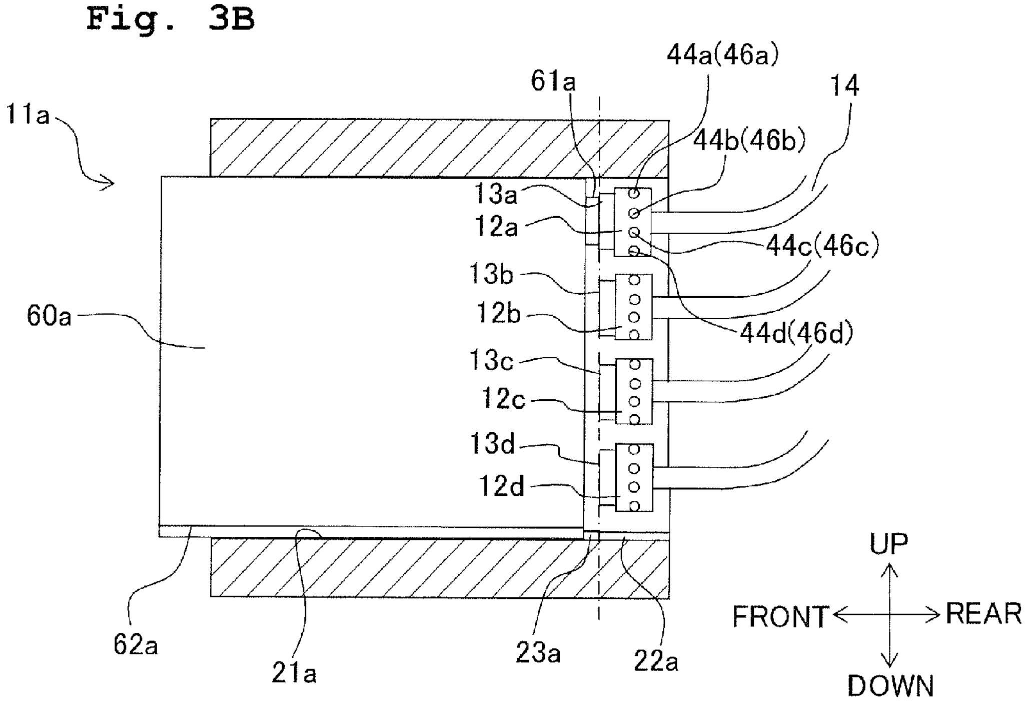
FIG. 3B is a side view corresponding to FIG. 2B.

As shown in FIG. 2A and FIG. 2B, four grooves 21*a*. 21*b*, 21*c*, and 21*d* (hereinafter, "grooves 21*a* to 21*d*"), which extend in a frontward and rearward direction and which are arranged in the left-right direction, are formed separately on a lower surface of the cartridge installing portions 11*a* to 11*d*, respectively.

As shown in FIG. 3A to FIG. 4B, front ends of the grooves 21*a* to 21*d* are open and rear ends of the grooves 21*a* to 21*d* are connected to fluid filling spaces 22*a*, 22*b*, 22*c*, and 22*d* (hereinafter, "fluid filling spaces 22*a* to 22*d*"), respectively. The fluid filling spaces 22*a* to 22*d*, at connecting portions of the grooves 21*a* to 21*d*, are spaces extending in the frontward and rearward direction from connecting portions at which the rear ends of the grooves 21*a* to 21*d* are connected to the fluid filling spaces 22*a* to 22*d*, respectively. A fluid such as a liquid is filled inside the fluid filling spaces 22*a* to 22*d*.

Moreover, sliders 23*a*, 23*b*, 23*c*, and 23*d* (hereinafter, "sliders 23*a* to 23*d*") (coordinating portions) are arranged in the grooves 21*a* to 21*d*, respectively. The sliders 23*a* to 23*d* are members each having almost a same width as each of the grooves 21*a* to 21*d* and extending in the frontward and rearward direction as a longitudinal direction. The sliders 23*a* to 23*d* are slidable along the grooves 21*a* to 21*d* and rear ends of the sliders 23*a* to 23*d* are inserted into the fluid filling spaces 22*a* to 22*d*, respectively.

Here, the sliders 23*a* to 23*d* arranged in the grooves 21*a* to 21*d* of the cartridge installing portion 11*a* have same lengths in the frontward and rearward direction. The same is applicable for the cartridge installing portions 11*b*, 11*c*, 11*d*, respectively. Furthermore, regarding the length in the frontward and rearward direction of the sliders 23*a* to 23*d*, the sliders 23*a* to 23*d* arranged in the cartridge installing portion 11*a* are longest, and the sliders 23*a* to 23*d* arranged in the cartridge installing portions 11*b* are longer than those arranged in the cartridge installing portion 11*c*. The sliders 23*a* to 23*d* arranged in the cartridge installing portion 11*d* are shortest.

The four ink infusing portions 12*a* to 12*d* are arranged on a rear side of the four cartridge installing portions 11*a* to 11*d* in the cartridge installing unit 6, and are arranged in upward and downward direction. Front ends of the ink infusing portions 12*a* to 12*d* (liquid infusing portions) are ink infusing ports 13*a*, 13*b*, 13*c*, and 13*d* respectively (hereinafter, "ink infusing ports 13*a* to 13*d*") for infusing the ink. Moreover, the ink infusing portions 12*a* to 12*d* are connected to the ink-jet head 4 via tubes 14 which are connected to rear-end portions of the ink infusing portions 12*a* to 12*d*, and ink infused from the ink infusing ports 13*a* to 13*d* is supplied to the ink-jet head 4 via the tubes 14. In the first embodiment, the ink infusing ports 13*a* to 13*d* are ports for infusing inks of black, yellow, cyan, and magenta colors respectively.

Moreover, the ink infusing portions 12*a* to 12*d* are movable along guide rails 15*a*, 15*b*, 15*c*, and 15*d* (hereinafter, "guide rails 15*a* to 15*b*") respectively which extends in the left-right direction through the four cartridge installing portions 11*a* to 11*d*. Accordingly, the four ink infusing portions 12*a* to 12*d* are movable between the four cartridge installing portions 11*a* to 11*d*.

Moreover, the ink infusing portions 12*a* to 12*d* are always biased in rightward direction by a spring not shown in the diagram, and when the ink cartridges 60*a* to 60*d* are not inserted and installed on the cartridge installing portions 11*a* to 11*d*, the ink infusing portions 12*a* to 12*d* are positioned at right end portions (initial position) of the guide rails 15*a* to 15*d* respectively as shown in FIG. 2A.

Figure 5:
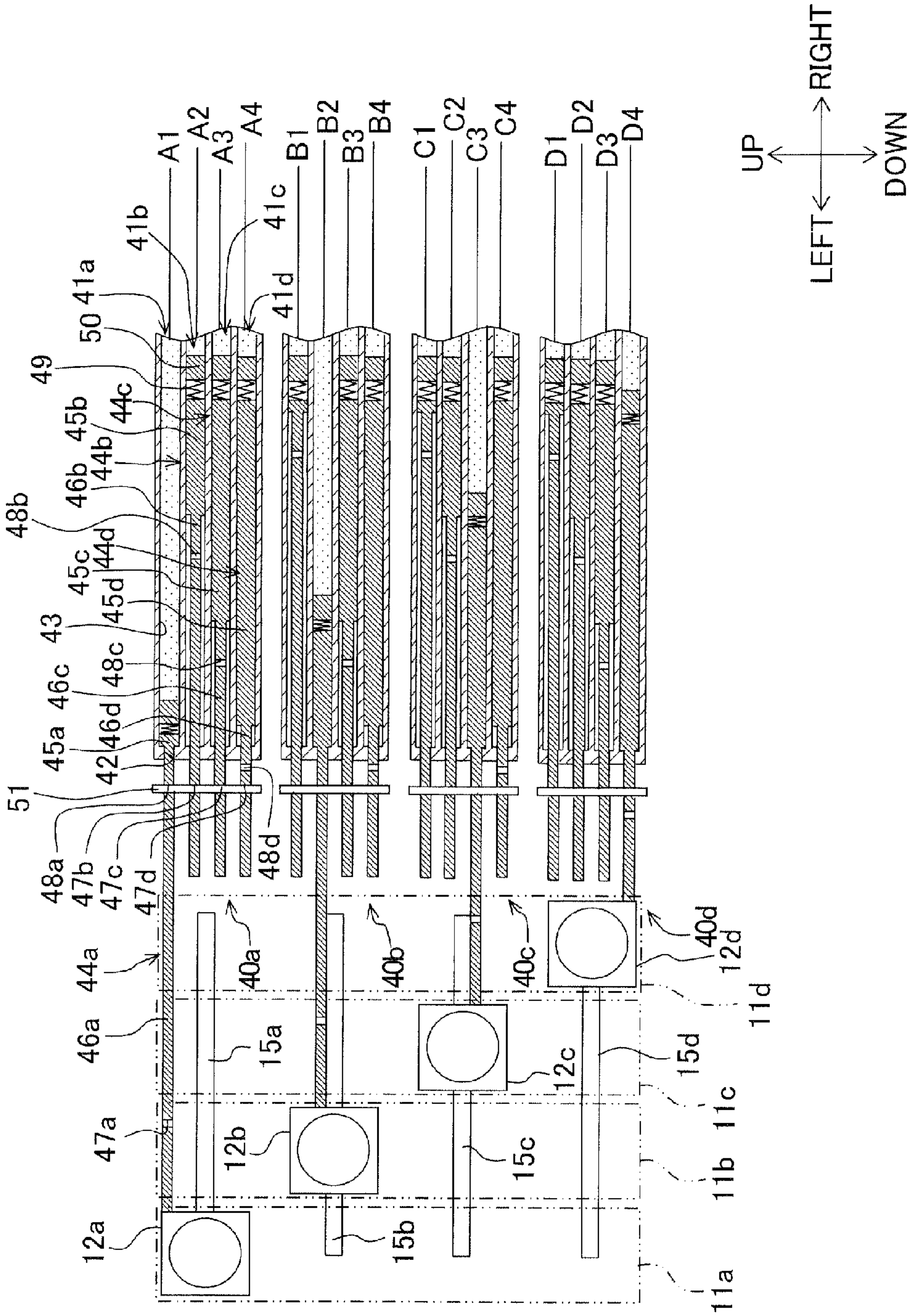
FIG. 5 is a diagram showing a positional relationship of an ink infusing portion and a pushing mechanism in FIG. 2, and a structure of the pushing mechanism.
Figure 6A:
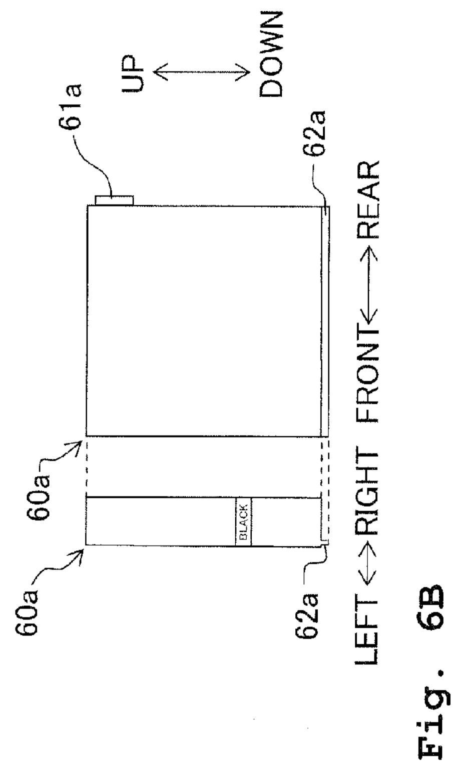
FIG. 6A, FIG. 6B, FIG. 6C, and FIG. 6D (hereinafter, "FIG. 6A to FIG. 6D") are diagrams each showing a structure of one of ink cartridges which are to be installed on the cartridge installing portions.
Figure 6B:
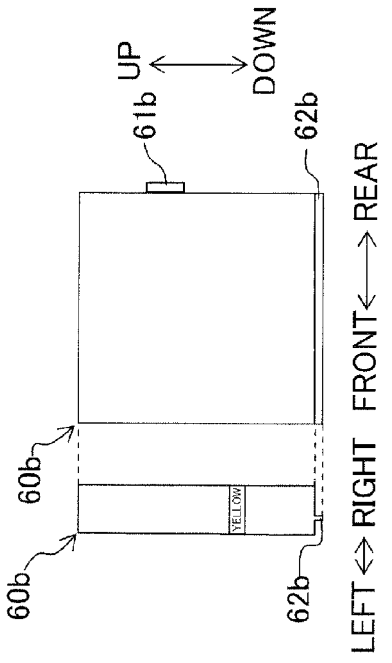
Figure 6C:
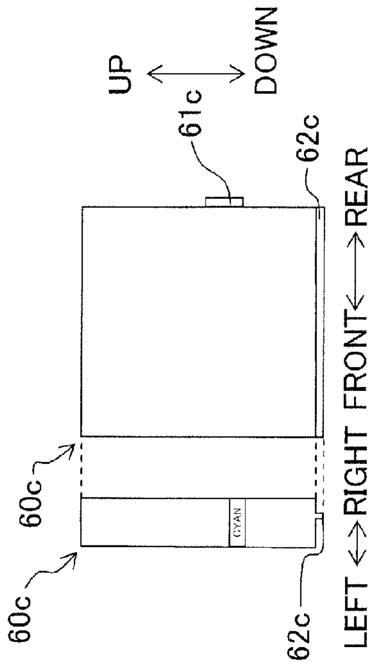
Figure 6D:
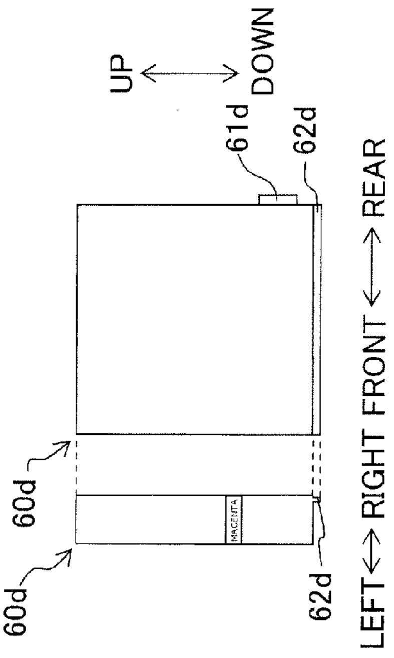

As shown in FIG. 5, the pushing mechanisms 40*a* to 40*d* are arranged on right sides of the ink infusing portions 12*a* to 12*d*, respectively.

Since all the pushing mechanisms 40*a* to 40*d* have the same structures, only the structure of the pushing mechanism 40*a* only will be described below. Four fluid filling spaces 41*a*, 41*b*, 41*c*, and 41*d* (hereinafter, "fluid filling spaces 41*a* to 41*d*") are formed in the pushing mechanism 40*a*. The fluid filling spaces 41*a* to 41*d* are spaces having substantially same circular cross-sectional shape, and left end portions thereof are small-diameter spaces 42. Portions on right sides of the small-diameter spaces 42 are large-diameter spaces 43 having diameters greater than those of the small-diameter spaces 42.

The right ends of the fluid filling spaces 41*a* to 41*d* are connected to the fluid filling spaces 22*a* to 22*d* described above, respectively, and the fluid filling spaces 41*a* to 41*d* are filled with the same liquid as in the fluid filling spaces 22*a* to 22*d*. Whereas, left ends of the fluid filling spaces 41*a* to 41*d* (small-diameter spaces 42) are open.

Connections between the fluid filling spaces 22*a* to 22*d* and the fluid filling spaces 41*a* to 41*d* will be described below. Reference numerals A1 to A4, B1 to B4, C1 to C4, and D1 to D4 shown in FIG. 4A, FIG. 4B, and FIG. 5 indicate connections between the fluid filling spaces 22*a* to 22*d* and the fluid filling spaces 41*a* to 41*d*. Concretely, it indicates that the fluid filling spaces 22*a* to 22*d* and the fluid filling spaces 41*a* to 41*d* having the same reference numerals are connected mutually.

The fluid filling spaces 22*a* to 22*d* and the fluid filling spaces 41*a* to 41*d* are connected by a space formed inside a wall of the cartridge installing unit 6 or tubes provided between the fluid filling spaces 22*a* to 22*d* and the fluid filling spaces 41*a* to 41*d*.

Figure 4B:
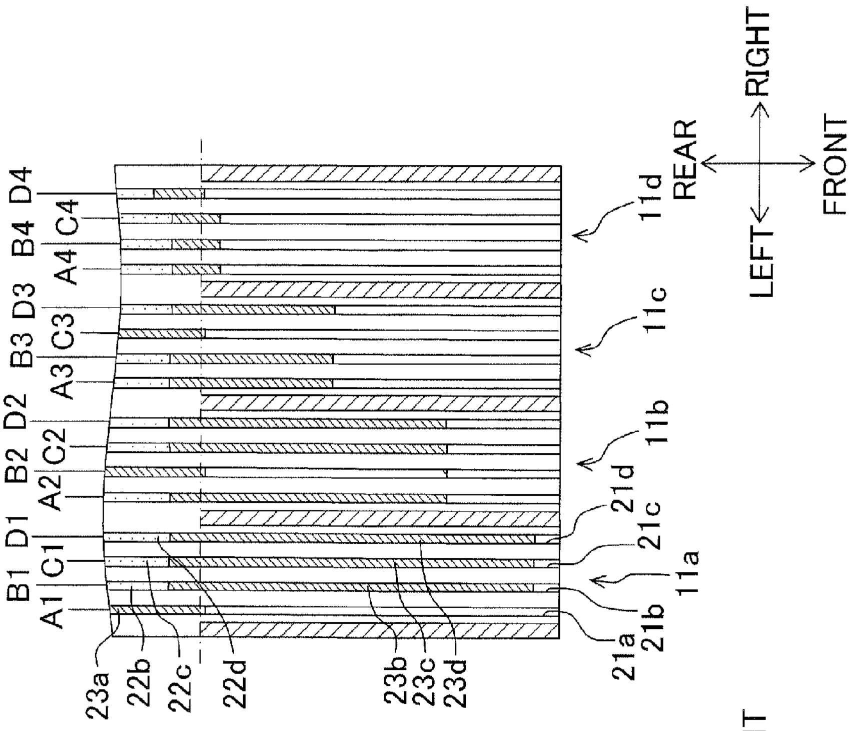
FIG. 4B is a cross-sectional view taken along a line IVB-IVB of FIG. 2B.
Figure 4A:
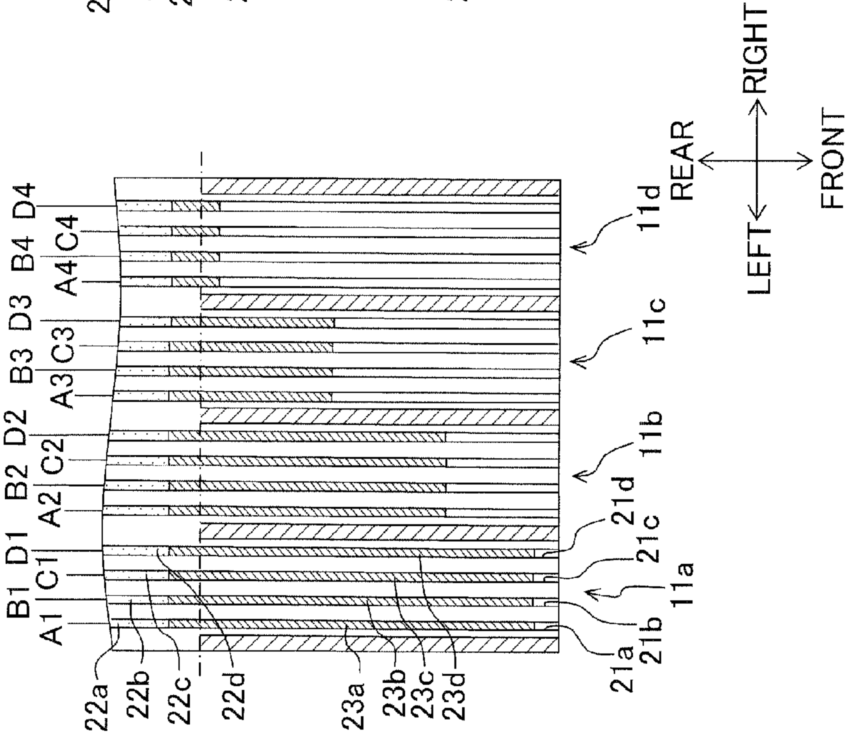
FIG. 4A is a cross-sectional view taken along a line IVA-IVA of FIG. 2A.

In the first embodiment, as shown by reference numerals A1 to A4 in FIG. 4A, FIG. 4B, and FIG. 5, the fluid filling spaces 22*a* of the cartridge installing portions 11*a* to 11*d* are connected to the fluid filling spaces 41*a* to 41*d* respectively of the pushing mechanism 40*a*. Moreover, as shown by reference numerals B1 to B4 in FIG. 4A, FIG. 4B, and FIG. 5, the fluid filling spaces 22*b* of the cartridge installing portions 11*a* to 11*d* are connected to the fluid filling spaces 41*a* to 41*d* respectively of the pushing mechanism 40*b*. Moreover, as shown by reference numerals C1 to C4 in FIG. 4A, FIG. 4B, and FIG. 5, the fluid filling spaces 22*c* of the cartridge installing portions 11*a* to 11*d* are connected to the fluid filling spaces 41*a* to 41*d* of the pushing mechanism 40*c*. Furthermore, as shown by reference numerals D1 to D4 in FIG. 4A, FIG. 4B, and FIG. 5, the fluid filling spaces 22*d* of the cartridge installing portions 11*a* to 11*d* are connected to the fluid filling spaces 41*a* to 41*d* of the pushing mechanism 40*d*.

Moreover, pushing members 44*a*, 44*b*, 44*c*, and 44*d* (hereinafter, "pushing members 41*a* to 41*d*") are arranged inside the fluid filling spaces 41*a* to 41*d*, respectively. The pushing members 44*a* to 44*d* are members having a substantially circular cross-sectional shape and extending in the left-right direction as a longitudinal direction. Portions including right-end portions of the pushing members 44*a* to 44*d* are large-diameter portions 45*a*, 45*b*, 45*c*, and 45*d* (hereinafter, "large-diameter portions 45*a* to 45*d*") having diameters almost same as the diameters of the large-diameter spaces 43 of the fluid filling spaces 41*a* to 41*d*. Portions on left sides of the large-diameter portions 45*a* to 45*d* are small-diameter portions 46*a*, 46*b*, 46*c*, and 46*d* (hereinafter, "small-diameter portions 46*a* to 46*d*") having diameters almost same as the diameters of the small-diameter spaces 42 of the fluid filling spaces 41*a* to 41*d*. Accordingly, the pushing members 44*a* to 44*d* are slidable in the left-right direction along the fluid filling spaces 41*a* to 41*d*. When the pushing members 44*a* to 44*d* are continued to be moved leftward, the large-diameter portions 45*a* to 45*d* make contacts with walls between the small-diameter spaces 42 and the large-diameter spaces 43, and cannot be moved leftward any more.

Furthermore, the small-diameter portions 46*a* to 46*d* of the pushing members 44*a* to 44*d* extend leftward up to outsides of the fluid filling spaces 41*a* to 41*d*, and a left end of each of the small-diameter portions 46*a* to 46*d* makes a contact with a right-end surface of the ink infusing portion 12*a* which corresponds to the pushing members 44*a* to 44*d*. When the pushing members 44*a* to 44*d* move leftward, the ink infusing portion 12*a* moves leftward by being pushed by the pushing members 44*a* to 44*d*. The pushing members 44*a* to 44*d* of the pushing mechanisms 40*b* to 40*d* move the ink infusing portions 12*b* to 12*d* leftward by pushing the ink infusing portions 12*b* to 12*d* similarly as it has been described above.

Here, a length of the small-diameter portion 46*a* of the pushing member 44*a* is almost same as a distance in the left-right direction between a right end of the ink infusing portion 12 which is moved up to the cartridge installing portion 11*a* and a left end of the fluid filling space 41*a*. Similarly, a length of the small-diameter portion 46*b* of the pushing member 44*b* is almost same as a distance in the left-right direction between a right end of the ink infusing portion 12 which is moved up to the cartridge installing portion 11*b* and a left end of the fluid filling space 41*b*. A length of the small-diameter portion 46*c* of the pushing member 44*c* is almost same as a distance in the left-right direction between a right end of the ink infusing portion 12 which is moved up to the cartridge installing portion 11*c* and a left end of the fluid filling space 41*c*. A length of the small-diameter portion 46*d* of the pushing member 44*d* is almost same as a distance in the left-right direction between a right end of the ink infusing portion 12 which is moved up to the cartridge installing portion 11*d* and a left end of the fluid filling space 41*d*.

Through holes 47*a*, 47*b*, 47*c*, and 47*d* (hereinafter, "through holes 47*a* to 47*d*") which extend in the vertical direction are formed in the small-diameter portions 46*a* to 46*d* at positions away by the same distances from left ends of the small-diameter portions 46*a* to 46*d*, respectively. Further, through holes 48*a*, 48*b*, 48*c*, and 48*c* (hereinafter, "through holes 48*a* to 48*d*") which extend in the vertical direction are formed in the small-diameter portions 46*a* to 46*d*. The through holes 48*a* to 48*d* are formed so that when the large-diameter portions 45*a* to 45*d* are moved leftward to make contacts with the walls between the small-diameter spaces 42 and the large-diameter spaces 43, the through holes 48*a* to 48*d* are positioned at positions of the through holes 47*a* to 47*d* in the pushing members 44*a* to 44*d* which are not moved leftward. For instance, the through hole 47*a* is formed at a position away by a predetermined distance from the left end of the small-diameter portion 46*a* of the pushing member 44*a*. The through hole 48*a* is formed so that when the large-diameter portion 45*a* makes a contact with the wall between the small diameter space 42 and the large diameter space 43 by moving the pushing member 44*a* leftward, the through hole 48*a* is positioned at a position overlapping the through hole 47*a* in the pushing member 44*a* which is not moved leftward. As it will be described later, a coupling member 51 (install regulating mechanism) which extends in the vertical direction can be inserted into each of the through holes 47*a* to 47*d* and the through holes 48*a* to 48*d*.

Members 50 having almost same diameters as those of the large-diameter portions 45*a* to 45*d* are arranged on right sides of the pushing members 44*a* to 44*d* via springs 49 (movement allowing mechanism).

Next, the four types of ink cartridges 60*a* to 60*d* to be installed on the cartridge installing portions 11*a* to 11*d* will be described below by referring to diagrams from FIG. 6A to FIG. 6D. In FIG. 6A to FIG. 6D, portions indicated on the left sides are front views in a state that the ink cartridges 60*a* to 60*d* are installed on the cartridge installing portions 11*a* to 11*d*, respectively. Moreover, in FIG. 6A to FIG. 6D, portions indicated on the right sides are right side views in a state that the ink cartridges 60*a* to 60*d* are installed on the cartridge installing portions 11*a* to 11*d*.

As shown in FIG. 6A to FIG. 6D, the ink cartridges 60*a* to 60*d* have substantially boxed shapes and are filled with inks of black, yellow, cyan, and magenta colors, respectively.

Moreover, the ink cartridges 60*a* to 60*d* are provided with ink supply portions 61*a* to 61*d* respectively, at portions positioned at the same height as the ink infusing portions 12*a* to 12*d* respectively, on side surfaces of the ink cartridges 60*a* to 60*d* which face the ink infusing portions 12*a* to 12*d* when the ink cartridges 60*a* to 60*d* are installed on the cartridge installing portions 11*a* to 11*d*.

Furthermore, projections 62*a*, 62*b*, 62*c*, and 62*d* (hereinafter, "projections 62*a* to 62*d*") are formed on a lower surface of the ink cartridges 60*a* to 60*d*, respectively, which are to be installed on the cartridge installing portions 11*a* to 11*d* respectively. More elaborately, the projections 62*a* to 62*d* are arranged so that the projections 62*a* to 62*d* face the grooves 21*a* to 21*d* respectively when the ink cartridges 60*a* to 60*d* are installed on the cartridge installing portions 11*a* to 11*d*. The projections 62*a* to 62*d* extend in the frontward and rearward direction, and have widths almost same as those of the grooves 21*a* to 21*d*, respectively. Accordingly, when the ink cartridges 60*a* to 60*d* are installed on the cartridge installing portions 11*a* to 11*d*, the projections 62*a* to 62*d* are engaged in the grooves 21*a* to 21*d*. Namely, in the first embodiment, any of the ink cartridges 60*a* to 60*d* of four types can be installed on any of the four cartridge installing portions 11*a* to 11*d*.

Next, an operation of each portion of the cartridge installing unit 6 when the ink cartridges 60*a* to 60*d* are installed on the cartridge installing portions 11*a* to 11*d* will be described below. For installing the ink cartridges 60*a* to 60*d* on the cartridge installing portions 11*a* to 11*d*, the ink cartridges 60*a* to 60*d* are inserted through openings at the front ends of the cartridge installing portions 11*a* to 11*d* as it has been described above.

Figure 7A:
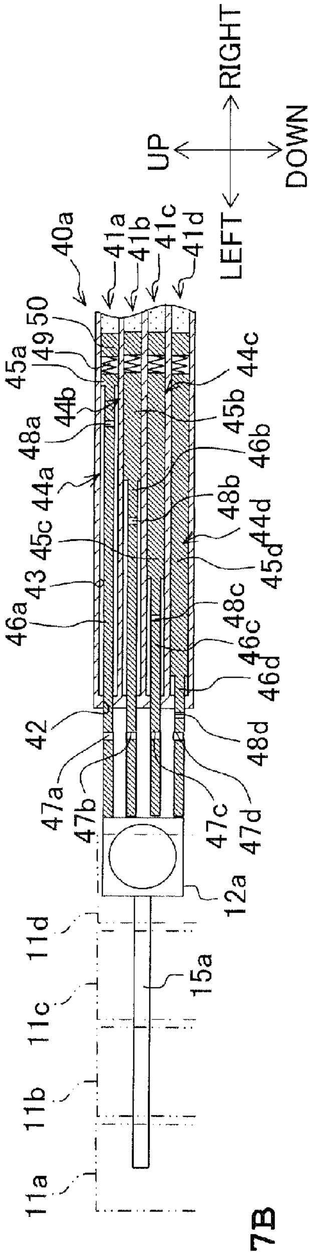
FIG. 7A, FIG. 7B, and FIG. 7C (hereinafter, "FIG. 7A to FIG. 7C") are diagrams showing a movement of an ink infusing portion when an ink cartridge is installed on a cartridge installing portion.
Figure 7B:
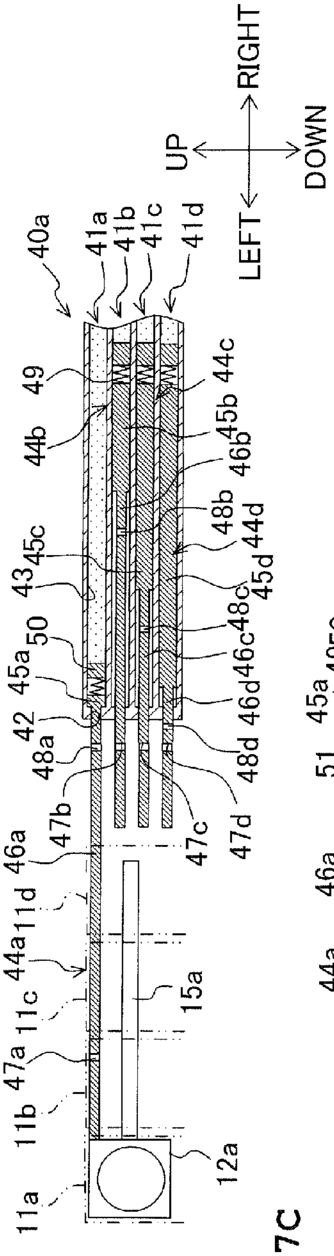
Figure 7C:
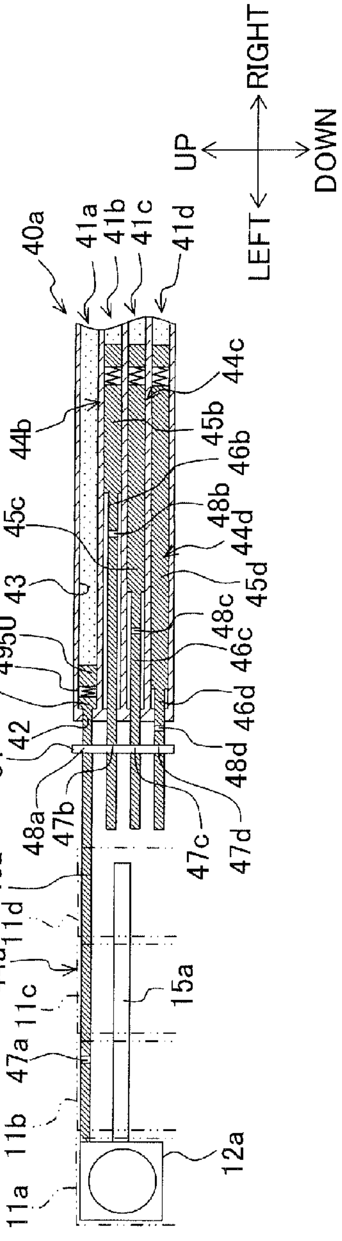

Firstly, the movement of the ink infusing portion 12*a* when the ink cartridge 60*a* filled with black ink is installed on the cartridge installing portion 11*a* at the extreme left side will be described by referring to FIG. 7A to FIG. 7C. When the ink cartridge 60*a* is not installed on the cartridge installing portion 11*a*, as shown in FIG. 7A, the pushing members 44*a* to 44*d* of the pushing mechanism 40*a* do not move the ink infusing portion 12*a*, and the ink infusing portion 12*a* is positioned at a right-end portion (initial position) of the guide rail 15*a* due to the bias applied in the right direction by a spring etc. which is not shown in the diagram.

As the ink cartridge 60*a* is inserted into the cartridge installing portion 11*a*, the projection 62*a* of the ink cartridge 60*a* is engaged in the groove 21*a* of the cartridge installing portion 11*a*, and the ink cartridge 60*a* moves rearward. With this movement of the ink cartridge 60*a*, the projection 62*a* also moves rearward. Due to the movement of the projection 62*a*, the slider 23*a* arranged in the groove 21*a* moves rearward by being pushed by the projection 62*a*, and the slider 23*a* pushes the fluid in the fluid filling space 22*a*.

The movement of the slider 23*a* is transmitted to the member 50 which is arranged in the fluid filling space 41*a* of the pushing mechanism 40*a*, via the fluid inside the fluid filling space 22*a* and the fluid filling space 41*a* of the pushing mechanism 40*a*. The member 50 and the pushing member 44*a* connected to the member 50 via the spring 49 move integrally leftward. As a result, the ink infusing portion 12*a* is pushed by the pushing member 44*a* (the small-diameter portion 46*a*) and moves leftward. In other words, the movement of the slider 23*a* is transmitted to the ink infusing portion 12*a* via the fluid inside the fluid filling spaces 22*a* and 41*a*, the member 50, the spring 49, and the pushing member 44*a*.

In this manner, it is possible to move the ink infusing portion 12*a* by transmitting the movement of the projection 62*a* to the ink infusing portion 12*a* when the ink cartridge 60*a* is inserted into the cartridge installing portion 11*a*. Therefore, an exclusive drive source is not necessary for moving the ink infusing portion 12*a*, and a structure of the apparatus becomes simple.

As it has been described above, the length of the small-diameter portion 46*a* of the pushing member 44*a* is almost the same as the distance between the right end of the ink infusing portion 12 which is moved up to the cartridge installing portion 11*a*, in other words, the right end of the cartridge installing portion 11*a*, and the left end of the fluid filling space 41*a*. Therefore, the pushing member 44*a*, as shown in FIG. 7B, moves the ink infusing portion 12*a* leftward until the ink infusing portion 12*a* reaches the cartridge installing portion 11*a*. However, when the ink infusing portion 12*a* has reached the cartridge installing portion 11*a*, the large-diameter portion 45*a* makes a contact with the wall between the small-diameter space 42 and the large-diameter space 43, and does not move any further leftward (transmission of the movement of the slider 23*a* to the ink infusing portion 12*a* by a transmission mechanism is cut off). Consequently, after the ink infusing portion 12*a* reaches the cartridge installing portion 11*a*, the ink infusing portion 12*a* is held at that position. In the first embodiment, the large-diameter space 43 and the small-diameter space 42 of the fluid filling space 41 combined with the large-diameter portion 45 of the pushing member 44 correspond to a cut-off mechanism according to the present invention.

On the other hand, in the first embodiment, parameters such as a cross-sectional area of the fluid filling spaces 22*a* and 41*a* are set to be such that, when the slider 23*a* has moved only by a predetermined distance which is shorter than a moving distance, the pushing member 44*a* moves to a position at which the large-diameter portion 45*a* makes a contact with the wall between the small-diameter space 42 and the large-diameter space 43. Here, the moving distance means a distance from a position at which the slider 23*a* is positioned just before the ink cartridge 60*a* is inserted into the opening of the cartridge installing portion 11*a* to another position at which the slider 23*a* is positioned when the ink cartridge 60*a* is completely installed on the cartridge installing portion 11*a*. In other words, the parameters such as the cross-sectional area of the fluid filling spaces 22*a* and 41*a* are set to be such that the large-diameter portion 45*a* of the pushing member 44*a* makes a contact with the wall between the small-diameter space 42 and the large-diameter space 43 before the ink cartridge 60*a* is completely installed on the cartridge installing portion 11*a*. Consequently, when the ink cartridge 60*a* is inserted half way into the cartridge installing portion 11*a*, the ink infusing portion 12*a* reaches the cartridge installing portion 11*a*, and the pushing member 44*a* does not move any further leftward.

In the first embodiment, since the member 50 is arranged at the right end of the pushing member 44*a* via the spring 49 as it has been described above, after the pushing member 44*a* has moved to the position at which the pushing member 44*a* does not move any further leftward, when the slider 23*a* is moved further rearward, the member 50 moved leftward by the spring 49 being contracted. In other words, the movement of the slider 23*a* is allowed even in a state in which the transmission of movement of the slider 23*a* to the ink infusing portion 12*a* is cut-off by the cut-off mechanism. Consequently, after the ink infusing portion 12*a* has reached the cartridge installing portion 11*a*, it is possible to insert the ink cartridge 60*a* further and to install completely on the cartridge installing portion 11*a*.

Moreover, as the ink cartridge 60 is installed completely on the cartridge installing portion 11*a*, the ink supply portion 61*a* and the ink infusing port 13*a* of the ink infusing portion 12*a* which has moved up to the cartridge installing portion 11*a* communicate, and the ink inside the ink cartridge 60*a* is supplied from the ink infusing port 13*a* to the ink-jet head 4 via the tube 14.

At this time, the ink infusing portion 12*a* has reached the cartridge installing portion 11*a* before the ink cartridge 60*a* is installed completely on the cartridge installing portion 11*a*. Accordingly, when the ink cartridge 60*a* is installed completely on the cartridge installing portion 11*a*, the ink supply portion 61*a* pushes the ink infusing port 13*a*, and the ink supply portion 61*a* and the ink infusing port 13*a* are connected assuredly.

When a sensor etc. not shown in the diagram which is provided to the cartridge installing portion 11*a* detects that the ink cartridge 60*a* has been installed completely on the cartridge installing portion 11*a*, the coupling member 51 is moved downward by an inserting mechanism not shown in the diagram, which moves the coupling member 51 in the vertical direction. The coupling member 51 is inserted through the through hole 48*a* in the small-diameter portion 46*a* and the through holes 47*b* to 47*d* formed in the small-diameter portions 46*b* to 46*d* which are arranged to face each other. Accordingly, the four pushing members 44*a* to 44*d* of the pushing mechanism 40*a* are made immovable by being coupled and fixed mutually. With this, the sliders 23*a* arranged inside the grooves 21*a* of the cartridge installing portions 11*b* to 11*d*, which are connected to the pushing members 44*b* to 44*d* via the fluid in the fluid filling spaces 22*b* to 22*d* and 41*b* to 41*d* are also made immovable.

Accordingly, even when an attempt is made to install the ink cartridge 60*a*, which is the same type as the ink cartridge installed on the cartridge installing portion 11*a*, on the cartridge installing portions 11*b* to 11*d* is made, the installing is inhibited as the projection 62*a* is caught in the slider 23*a* which has made immovable. Accordingly, it is possible to prevent the plurality of ink cartridges 60*a* of the same type from being installed mistakenly on the cartridge installing portions 11*a* to 11*d*.

Similarly, when the ink cartridge 60*a* is installed on the cartridge installing portions 11*b* to 11*d*, the pushing members 44*b* to 44*d* of the pushing mechanism 40*a* are moved by the sliders 23*a* inside the grooves 21*a* of the cartridge installing portions 11*b* to 11*d* being pushed by the projections 62*a*. Accordingly, the ink infusing portion 12*a* moves up to the cartridge installing portions 11*b* to 11*d*, and the ink supply portion 61*a* and the ink infusing port 13*a* are connected.

Similarly, in a case of installing the ink cartridges 60*b* to 60*d* on the cartridge installing portions 11*a* to 11*d*, the pushing members 44*a* to 44*d* corresponding to the pushing mechanisms 40*b* to 40*d* move by the sliders 23*b* to 23*d* inside the grooves 21*b* to 21*d* of the cartridge installing portions 11*a* to 11*d* being pushed by the projections 62*b* to 62*d*. Accordingly, the ink infusing portions 12*b* to 12*d* are moved up to the cartridge installing portions 11*a* to 11*d*, and the ink supply portions 61*b* to 61*d* and the ink infusing ports 13*b* to 13*d* are connected.

In the first embodiment, a combination of the fluids inside the fluid filling spaces 22 and 41 which are mutually connected, the pushing member 44, the spring 49, and the member 50, correspond to the transmission section according to the present invention. Moreover, a combination of the four sliders 23*a* and the four transmission section connected to the four sliders 23*a*, a combination of four sliders 23*b* and four transmission sections connected to the four sliders 23*b*, a combination of the four sliders 23*c* and the four transmission sections connected to the four slider 23*c*, and a combination of the four sliders 23*d* and the four transmission sections connected to the sliders 23*d* corresponds to the moving mechanisms according to the present invention, respectively.

Similarly when the ink cartridges 60*b* to 60*d* are to be installed on the cartridge installing portion 11, the coupling member 51 is inserted through the through hole 48 of the pushing member 44 which has moved the ink infusing portion 12 and the through holes 47 in the other three pushing members 44 in the corresponding pushing mechanisms 40*b* to 40*d*, after the ink cartridges 60*b* to 60*d* have been installed on the cartridge installing portion 11. Accordingly, the sliders 23*b* to 23*d* corresponding to the ink cartridges 60*b* to 60*d* which have been installed are made immovable, and the ink cartridge 60 of the same type are prevented from being installed on the plurality of cartridge installing portions 11.

As it has been described above, in the first embodiment, even when any of the ink cartridges 60*a* to 60*d* of four types is installed on any of the four cartridge installing portions 11*a* to 11*d*, the corresponding ink infusing portion 12 moves up to the cartridge installing portion 11 on which the ink cartridge 60 has been installed, and the ink infusing port 13 and the ink supply portion 61 communicate. Consequently, when the ink cartridges 60*a* to 60*d* are installed, it is not necessary to install upon confirming as to on which cartridge installing portion 11*a* to 11*d* the ink cartridge is to be installed, and installing of the ink cartridge 60 becomes easy.

Next a second embodiment which is an exemplary embodiment of the present invention will be described below.

In the second embodiment, a cartridge installing unit 106 is provided with two cartridge installing portions 111*a* and 111*b*, and two ink infusing portions 112*a* and 112*b*.

Figures 8A, 8B, 8C:
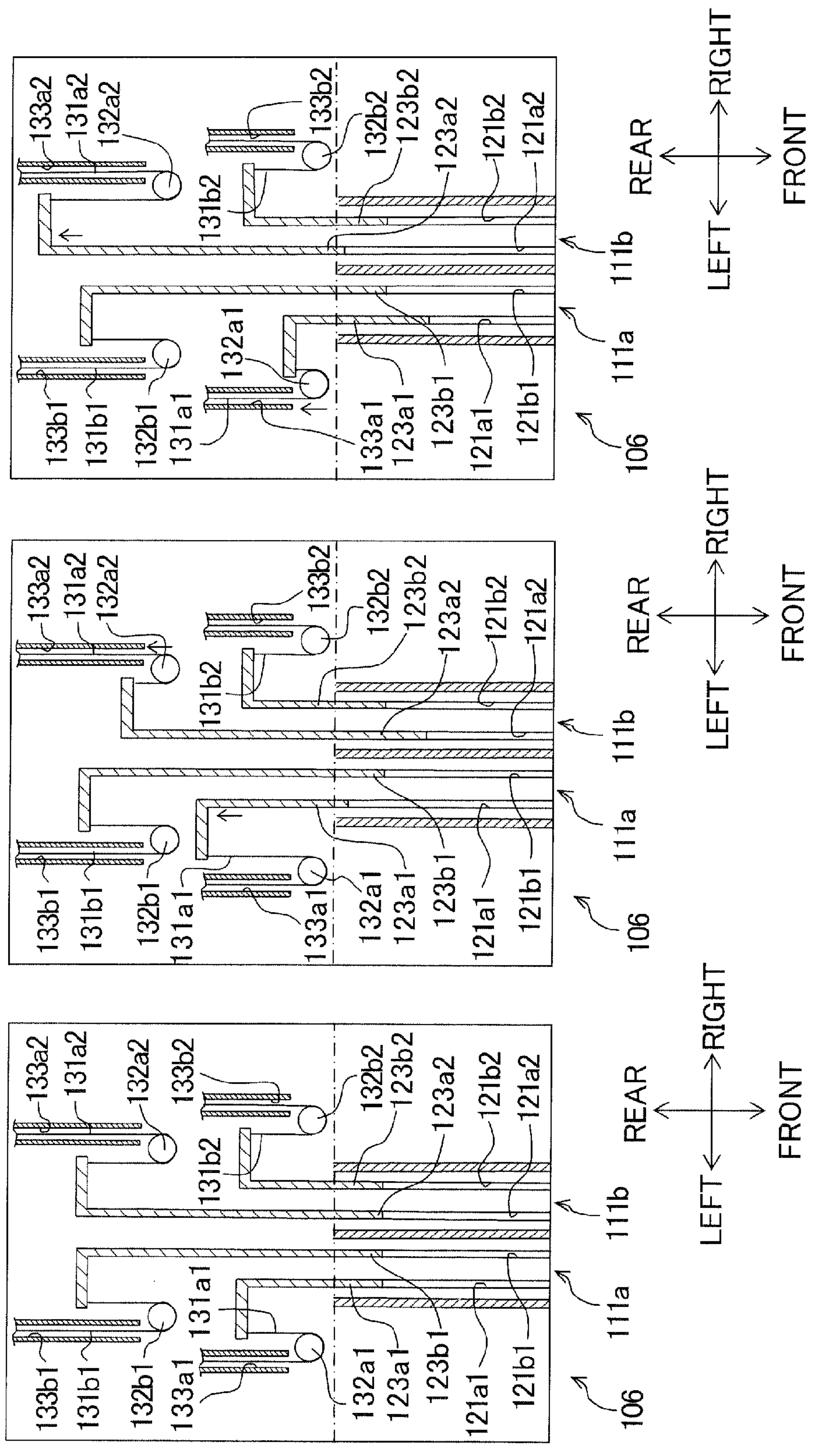
FIG. 8A, FIG. 8B, and FIG. 8C (hereinafter, "FIG. 8A to FIG. 8C") are diagrams showing a movement of a slider while installing a cartridge on a cartridge installing portion in a second embodiment.

As shown in FIG. 8A, FIG. 8B, and FIG. 8C, two grooves 121*a*1 and 121*b*1 are formed in a lower surface of the cartridge installing portion 111*a*, and two groove 121*a*2 and 121*b*2 are formed in a lower surfaces of the cartridge installing portion 111*b*. The grooves 121*a*1, 121*b*1, 121*a*2, and 121*b*2 extend in the frontward and rearward direction, and front ends thereof are open.

Figure 9:
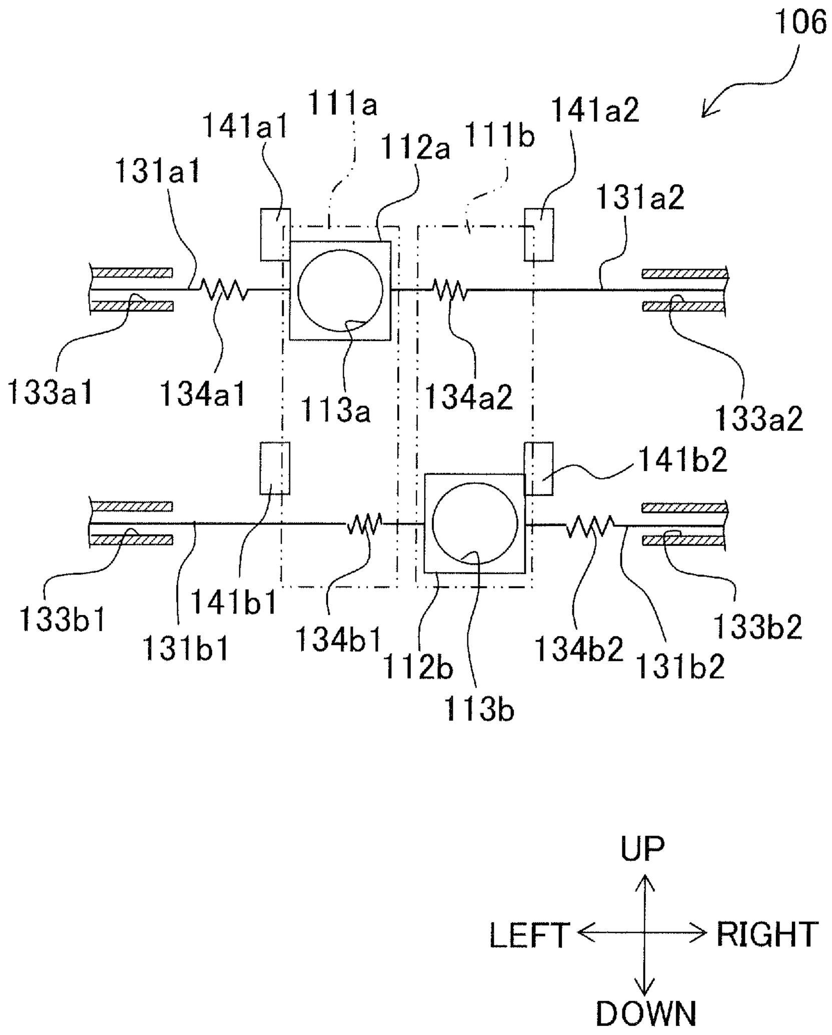
FIG. 9 is a diagram equivalent to FIG. 5, of the second embodiment.

Sliders 123*a*1 and 123*b*1 (coordinating portions) are arranged in the grooves 121*a*1 and 121*b*1 respectively. The sliders 123*a*1 and 123*b*1 extend over the grooves 121*a*1 and 121*b*1 respectively in the rearward direction, and rear-end portions of the sliders 123*a*1 and 123*b*1 are bent toward left in FIG. 8A to FIG. 8C. Moreover, one end of a wire 131*a*1 and one end of a wire 131*b*1 (transmission section) are fixed to the rear-end portions of the sliders 123*a*1 and 123*b*1, respectively. The wires 131*a*1 and 131*b*1, upon being put around pulleys 132*a*1 and 132*b*1 respectively, are passed through wire passages 133*a*1 and 133*b*1 respectively, and extend up to a left side of the ink infusing portions 112*a* and 112*b*. The other ends of the wires 131*a*1 and 131*b*1 are fixed to left-end portions of the ink infusing portions 112*a* and 112*b* respectively, via springs 134*a*1 and 134*b*1 (movement allowing mechanism) respectively as shown in FIG. 9.

Sliders 123*a*2 and 123*b*2 (coordinating portions) are arranged in the grooves 121*a*2 and 121*b*2 respectively. The sliders 123*a*2 and 123*b*2 extend over the grooves 121*a*2 and 121*b*2 respectively in the reward direction, and rear-end portions of the sliders 123*a*2 and 123*b*2 are bent toward right in FIG. 8A to FIG. 8C. Moreover, one end of a wire 131*a*2 and one end of a wire 131*b*2 (transmission section) are fixed to the rear-end portions of the sliders 123*a*2 and 123*b*2 respectively. The wires 131*a*2 and 131*b*2, upon being put around pulleys 132*a*2 and 132*b*2 respectively, are passed through wire passages 133*a*2 and 133*b*2 respectively, and extend up to a right side of the ink infusing portions 112*a* and 112*b*. The other ends of the wires 131*a*2 and 131*b*2 are fixed to right-end portions of the ink infusing portions 112*a* and 112*b* respectively, via springs 134*a*2 and 134*b*2 (movement allowing mechanism) respectively as shown in FIG. 9.

The abovementioned sliders 123*a*1, 123*a*2, 123*b*1, and 123*b*2 are slidable in the frontward and rearward direction along the grooves 121*a*1, 121*a*2, 121*b*1, and 121*b*2 respectively.

The ink infusing portions 112*a* and 112*b* are portions having a structure similar to the structure of the ink infusing portion 12 of the first embodiment, and front ends thereof are ink infusing ports 113*a* and 113*b*. Moreover, the ink infusing portions 112*a* and 112*b*, as it will be described later, move in the left-right direction by being pulled by the wires 131*a*1, 131*a*2, 131*b*1 and 131*b*2. In the second embodiment, a combination of the sliders 123 and the wires 131 corresponds to the moving mechanism according to the present invention.

Moreover, stoppers **141*a*1 and 141*a*2 (movement regulating mechanism) are arranged on a left side and a right side respectively of the ink infusing portion 112*a*, and stoppers 141*b*1 and 141*b*2 (movement regulating mechanism) are arranged on a left side and a right side respectively of the ink infusing portion 112*b***.

The stoppers **141*a*1 and 141*b*1 make contacts with left ends of the ink infusing portions 112*a* and 112*b* respectively, which have reached the cartridge installing portion 111*a*, and regulate the ink infusing portions 112*a* and 112*b* from moving any further leftward. Whereas, the stoppers 141*a*2 and 141*b*2 make contacts with right ends of the ink infusing portions 112*a* and 112*b* respectively, which have reached the cartridge installing portion 111*b*, and regulate the ink infusing portions 112*a* and 112*b*** from moving any further rightward.

Here, in the second embodiment, the ink cartridges 60 (refer to FIG. 6A to FIG. 6D), similarly as in the first embodiment, are to be installed on the cartridge installing portions **111*a* and 111*b*. However, in the second embodiment, two types of ink cartridges 60 are installed. One of the ink cartridges 60 (hereinafter, "a first cartridge") has the ink supply portion 61 (refer to FIG. 6A to FIG. 6D) which is positioned at a same height as the infusing port 113*a* when the first cartridge is installed on any one of the cartridge installing portions 111*a* and 111*b*, and has the projection 62 (refer to FIG. 6A to FIG. 6D) which is formed at a position facing the (a position opposite to the) grooves 121*a*1 and 121*a*2. The other of the ink cartridges 60 (hereinafter, "a second cartridge") has the ink supply portion 61 (refer to FIG. 6A to FIG. 6D) which is positioned at a same height as the infusing port 113*b* when the second cartridge is installed on any one of the cartridge installing portions 111*a* and 111*b*, and has the projection 62 (refer to FIG. 6A to FIG. 6D) which is formed at a position facing the (a position opposite to the) grooves 121*b*1 and 121*b*2. Inks of two different colors (such as black and red) are filled in these two types of ink cartridges 60**.

Next, an operation when the ink cartridge 60 is installed on the cartridge installing portions **111*a* and 111*b*** will be described below.

Figure 10A:
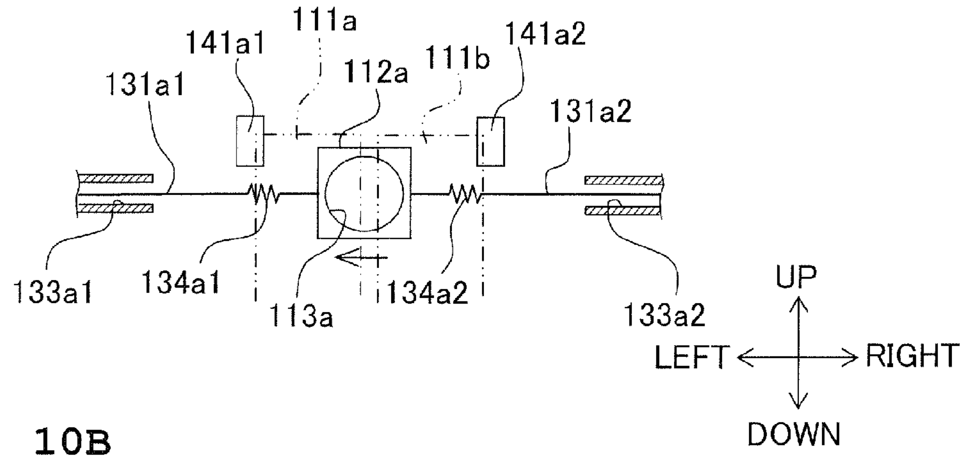
FIG. 10A, FIG. 10B, and FIG. 10C (hereinafter, "FIG. 10A to FIG. 10C") are diagrams showing a movement of the ink infusing portion when an ink cartridge is installed on a cartridge installing portion in the second embodiment.
Figure 10B:
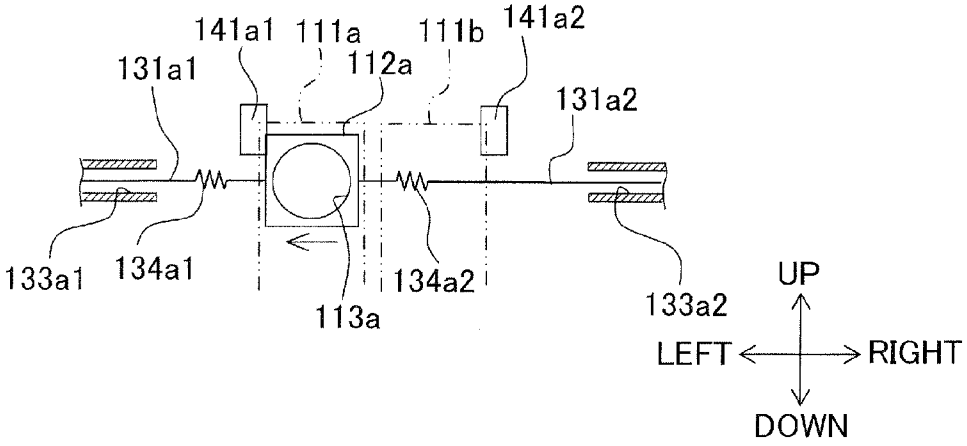
Figure 10C:
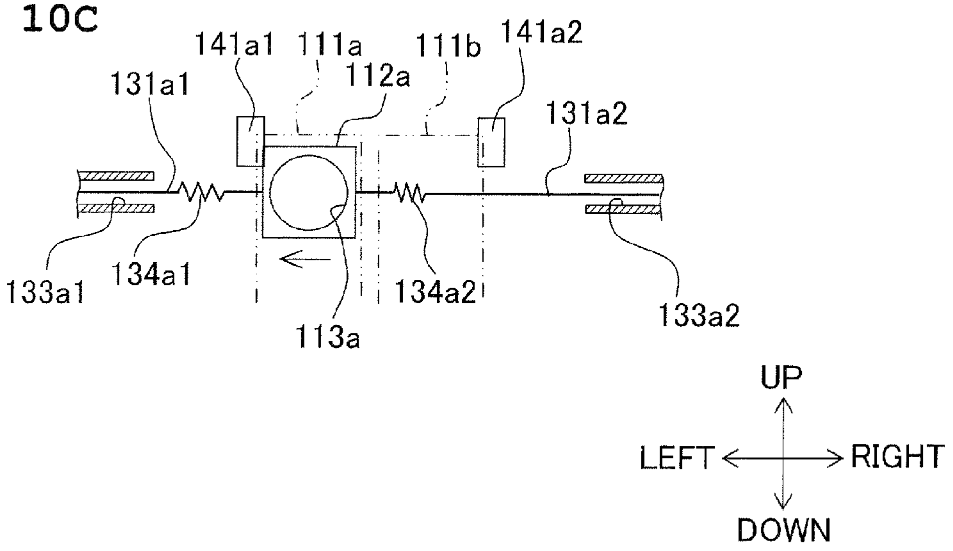

FIG. 8A and FIG. 8B are diagrams showing a movement of the sliders **123*a*1 and 123*a*2 when the first cartridge is installed on the cartridge installing portion 111*a*. Moreover, FIG. 10A, FIG. 10B, and FIG. 10C are diagrams showing a movement of the ink infusing portion 112*a* when the first cartridge is installed. When the first cartridge is inserted into the cartridge installing portion 111*a*, the slider 123*a*1 moves rearward by being pushed by the projection 62 of the first cartridge, similarly as in the first embodiment. Accordingly, the wire 131*a*1 is pulled by the slider 123*a*1, and in conjunction with this, the ink infusing portion 112*a* moves rearward as shown in FIG. 10A. In other words, the movement of the slider 123*a*1 is transmitted to the ink infusing portion 112*a* via the wire 131*a*1**.

In this manner, when the first cartridge is inserted into the cartridge installing portion **111*a*, since it is possible to move the ink infusing portion 112*a* by transmitting the movement of the projection 62 to the ink infusing portion 112*a*, a drive source for moving the ink infusing portion 112*a*** is not required separately, and a structure of the apparatus becomes simple.

Further, as the ink infusing portion **112*a* moves toward the cartridge installing portion 111*a* to reach the cartridge installing portion 111*a*, the ink infusing portion 112*a* makes a contact with the stopper 141*a*1. Accordingly, the ink infusing portion 112*a*** stops moving any further leftward, and is held at that position.

Here, in the second embodiment, a length of the wire **131*a*1 is set to be such that, when the slider 123*a*1 has moved only by a predetermined distance which is shorter than a moving distance, the ink infusing portion 112*a* reaches the cartridge installing portion 111*a*. Here, the moving distance means a distance from a position at which the slider 123*a*1 is positioned just before the first cartridge 60*a* is inserted into the opening of the cartridge installing portion 111*a* to another position at which the slider 23*a*1 is positioned when the first cartridge 60*a* is completely installed on the cartridge installing portion 111*a*. In other words, the length of the wire 131*a*1 is set to be such that the ink infusing portion 112*a* reaches the cartridge installing portion 111*a* before the first cartridge 60*a* is installed completely on the cartridge installing portion 111*a*. Consequently, when the first cartridge has been installed half way on the cartridge installing portion 111*a*, the ink infusing portion 112*a* reaches the cartridge installing portion 111*a*, and then onward, even when the wire 131*a*1 is pulled by the slider 123*a*1, the ink infusing portion 112*a*** does not move and is held at that position.

In the second embodiment, since the wire **131*a*1 and the ink infusing portion 112*a* are connected via the spring 134*a*1, when the slider 123*a*1 moves further rearward from this state and the wire 131*a*1 is pulled, the spring 134*a*1 is extended. In other words, the movement of the slider 123*a*1 is allowed even in a state in which the movement of the ink infusing portion 112*a* is being regulated by the stopper 141*a*1. Consequently, it is possible to install the first cartridge completely on the cartridge installing portion 111*a* by inserting further the first cartridge, after the ink infusing portion 112*a* has reached the cartridge installing portion 111*a***.

When the first cartridge is installed completely on the cartridge installing portion **111*a*, the ink supply portion 61 of the first cartridge and the ink infusing port 113*a* of the ink infusing portion 112*a* which has moved up to the cartridge installing portion 111*a* communicate, and the ink inside the first cartridge is supplied to the ink-jet head 4 from (through) the ink infusing port 113*a* (refer to FIG. 1**).

At this time, since the ink infusing portion **112*a* has reached the cartridge installing portion 111*a* before the first cartridge is installed completely on the cartridge installing portion 111*a*, when the first cartridge is installed on the cartridge installing portion 111*a*, the ink supply portion 61 of the first cartridge pushes the ink infusing port 113*a*, and the ink supply portion 61 and the ink infusing port 113*a*** are connected assuredly.

On the other hand, as the ink supply portion **112*a* moves leftward, the wire 131*a*2 on a side of the cartridge installing portion 111*b* is pulled by the ink infusing portion 112*a*, and in conjunction with this, the slider 123*a*2 moves frontward and cannot move rearward due to tension in the wire 131*a*2**.

Accordingly, when a first cartridge of the same type as the first cartridge which has been installed on the cartridge installing portion **111*a* is to be installed on the cartridge installing portion 111*b*, the projection 62 makes a contact with the slider 123*a*2 which has become immovable, and the installing is regulated. Consequently, the same first cartridge is prevented from being installed mistakenly on both the cartridge installing portions 111*a* and 111*b***.

FIG. 8C is a diagram showing a movement of the sliders **123*a*1 and 123*a*2 when the first cartridge is installed on the cartridge installing portion 111*b*. As the first cartridge is inserted into the cartridge installing portion 111*b*, the slider 123*a*2 is pushed by the projection 62 of the first cartridge, and inversely of what has been mentioned above, the ink infusing portion 112***a* moves up to the cartridge installing portion 111*b*, and the ink supply portion 61 of the first cartridge and the ink infusing port 113*a* communicate, and also the slider 123*a*1 becomes immovable. Accordingly, the installing of the first cartridge on the cartridge installing portion 111*a* is regulated.

Similarly, when the second cartridge has been installed on the cartridge installing portions 111*a* and 111*b*, the ink infusing portion 112*b* moves up to the cartridge installing portion 111*a* and 111*b*, respectively, by the sliders 123*b*1 and 123*b*2 being pushed by the projection 62 of the second cartridge, and the ink supply portion 61 of the second cartridge and the ink infusing port 113*b* communicate. For one cartridge installing portion 111 on a side opposite to the other cartridge installing portion 111 on which the second cartridge has been installed, the installing of the second cartridge is regulated by the slider 123*b* (one of the sliders 123*b*1 and 123*b*2) becoming immovable similarly as described above. In the second embodiment, the wires 131*a*1, 131*a*2, 131*b*1, and 131*b*2 corresponding to the transmission section of the present invention also serve as the install regulating mechanism according to the present invention.

In this manner, in the second embodiment, even when the first cartridge and the second cartridge are installed on any of the cartridge installing portions 111*a* and 111*b*, the corresponding ink infusing portion 112 moves up to the cartridge installing portion 111, and the ink supply portion 61 and the ink infusing port 113 communicate. Therefore, when the first cartridge and the second cartridge are installed, it is not necessary to install upon confirming as to on which of the cartridge installing portions 111*a* and 111*b* the cartridge is to be installed, and the installing of the ink cartridge 60 becomes easy.

In the second embodiment, the inks of two different colors were filled in the ink cartridges of two types. However, without restricting to this, the first cartridge may be filled with the black ink and the second cartridge may be filled with inks of plurality of types of colors (such as yellow, cyan, and magenta). In this case, the ink supply portion 61 of the second cartridge is divided into three corresponding to inks of three colors, and furthermore, ink supply ports 113 and tubes 14 corresponding to these inks may be provided.

Next, modified embodiments in which various modifications are made in the first embodiment and the second embodiment will be described below. However, same reference numerals are assigned to components having a structure similar to the components in the first embodiment and the second embodiment, and description thereof is omitted.

In the first embodiment and the second embodiment, an arrangement is made such that when the ink cartridge 60 has been installed half way on the cartridge installing portions 11 and 111, the corresponding ink infusing portions 12 and 112 reach the cartridge installing portions 11 and 111 respectively. However, the arrangement is not restricted to such an arrangement. For instance, the spring 49 and the member 50 of the first embodiment, and the spring 134 of the second embodiment may not be provided, and the corresponding ink infusing portions 12 and 112 may reach the cartridge installing portions 11 and 111 respectively, almost at the same time as the ink cartridge 60 is installed completely on the cartridge installing portions 11 and 111.

Moreover, in the first embodiment and the second embodiment, the same type of ink cartridges 60 are regulated from being installed on the plurality of cartridge installing portions 11 and 111 by regulating the movement of the sliders 23 and 123 corresponding to the ink cartridges 60 which have been installed. However, without restricting to such an arrangement, the installing of the ink cartridges 60 may be regulated by some other installing regulating mechanism such as a projection which comes out from a bottom surface of grooves 21 and 121 corresponding to the ink cartridge 60 which is to be restricted from being installed.

Furthermore, the installing regulating mechanism for preventing the same ink cartridges 60 from being installed on the plurality of cartridge installing portions 11 and 111 may not be provided. Even in this case, since it is possible to identify easily the type of the ink cartridge from the indication on an outer surface of the ink cartridge 60 which has been installed, cases in which the same type of the ink cartridges 60 are installed on the plurality of cartridge installing portions are few.

Moreover, in the first embodiment and the second embodiment, the sliders 23 and 123 have been arranged in the grooves 21 and 121 formed in the lower surfaces of the cartridge installing portions 11 and 111, and the projection 62 has been formed on the lower surface of the ink cartridge 60. However, the sliders 23 and 123, and the projection 62 may be formed on the other portion of the cartridge installing portions 11 and 111, and the ink cartridge 60, respectively. Moreover, the sliders 23 and 123 which are projected upward from the grooves 21 and 121 respectively, may be formed in the cartridge installing portions 11 and 111, and in the lower surface of the ink cartridge 60, a cartridge groove may not be formed at a position corresponding to the type of the ink which is stored in the ink cartridge 60, but cartridge grooves may be formed at positions other than the position corresponding to the type of the ink which is stored in the ink cartridge 60. In this case, since a cartridge groove is not formed at the position corresponding to the type of the ink which is stored in the ink cartridge 60, only one of the sliders 23 or only one of the sliders 123 corresponding to the type of the ink makes a contact with the ink cartridge 60, and is moved.

Moreover, in the first embodiment, the movement of the slider 23 has been transmitted to the ink infusing portion 12 via the pushing member 44 and the fluid filled in the fluid filling spaces 22 and 41. In the second embodiment, the movement of the slider 23 has been transmitted to the ink infusing portion 112 via the wire 131. However, the arrangement is not restricted to such an arrangement. For example, the movement of the sliders 23 and 123 is detected by a sensor such as a photosensor, a motor may be driven to move the ink infusing portions 12 and 112.

Moreover, in the first embodiment and the second embodiment, when the ink cartridge is installed on the cartridge installing portions 11 and 111, the movement of the projection 62 has been transmitted to the ink infusing portions 12 and 112 by moving the sliders 23 and 123 which make contacts with the projection 62. However, the arrangement is not restricted to such an arrangement. A type indicating portion other than the protrusion which indicates the type may be provided at a position corresponding to the type of the ink cartridge, and a coordinating portion other than the slider, which moves in conjunction with the movement of the type indicating portion when the ink cartridge is installed, may be provided at a position, of the cartridge installing portions 11 and 111, corresponding to each type indicating portion.

In this case, the type indicating portion and the coordinating portion may be portions which make contacts with each other such as the sliders 23 and 123, and the projection 62 in the first embodiment and the second embodiment. Alternatively, the type indicating portion and the coordinating portion may be portions which do not make contacts with each other, and in which, for example, a magnet is used.

The arrangement is not restricted to an arrangement of moving the ink infusing portions 12 and 112 by transmitting the movement of the type indicating portion (such as the projection 62) to the ink infusing portions 12 and 112, when the ink cartridge 60 is installed on the cartridge installing portions 11 and 111. The infusing portions 12 and 112 may be moved by a moving mechanism which includes a drive source such as a motor.

In this case, a structure (such as the projection 62, and the sliders 23 and 123), which move in conjunction with the movement of the ink cartridge 60 when the ink cartridge 60 is installed on the cartridge installing portions 11 and 111, is not necessary. For example, the ink cartridge 60 may be provided with an IC chip in which information indicating the type of the ink cartridge 60 is recorded, and each of the cartridge installing portions 11 and 111 may be provided with a reading unit which reads the IC chip. The moving mechanism may be controlled in accordance with a reading result of the reading unit to move the ink infusing portions 12 and 112 to the cartridge installing portions 11 and 111 on which the ink cartridge 60 is installed.

In the first embodiment and the second embodiment, as the ink cartridge 60 is installed on the cartridge installing portions 11 and 111, the movement of the projection 62 as the type indicating portion of the ink cartridge 60 has been transmitted to the ink infusing portions 12 and 112. However, the cartridge installing portions 11 and 111 may be provided with a detecting section which detects the type of the ink cartridge 60 which has been inserted into the cartridge installing portions 11 and 111, from the position of the projection 62 in the ink cartridge 60, and the ink infusing portions 12 and 112 corresponding to the ink cartridge 60 which is detected by the detecting section may be moved to the cartridge installing portions 11 and 111 on which the detected ink cartridge 60 is installed. Further, a display section which displays the type of the ink which has been detected by the detecting section may be provided to the printer 1.

In the description made above, an example in which the present invention is applied to an ink-jet printer for jetting inks from the nozzles has been described. However, the present invention is also applicable to other apparatuses in which liquid cartridges storing liquid other than ink are installable and which discharge the liquid other than ink.

What is claimed is:

1. A cartridge installing unit on which a plurality of types of liquid cartridges are to be installed, comprising:

a plurality of cartridge installing portions on which the plurality of types of liquid cartridges are installed;

a plurality of liquid infusing portions each of which corresponds to one of the plurality of types of liquid cartridges, and each of which is provided to be movable across the plurality of cartridge installing portions to communicate with corresponding liquid cartridge; and a plurality of moving mechanisms each of which moves one of the plurality of liquid infusing portions across the plurality of cartridge installing portions;

wherein when a liquid cartridge among the liquid cartridges is installed on a cartridge installing portion among the cartridge installing portions, a moving mechanism among the moving mechanisms moves a liquid infusing portion corresponding to the liquid cartridge to the cartridge installing portion on which the liquid cartridge is installed.

2. The cartridge installing unit according to claim 1, further comprising a detecting section which detects a type of the liquid cartridge, wherein a moving mechanism among the moving mechanisms moves the liquid infusing portion corresponding to the liquid cartridge, which is detected by the detecting section, to the cartridge installing portion on which the liquid cartridge is installed.

3. The cartridge installing unit according to claim 1;

wherein the liquid cartridges have type indicating portions which indicate the types of the liquid cartridges respectively, at positions corresponding to the types of the liquid cartridges respectively; each of the moving mechanisms includes a plurality of coordinating portions which the cartridge installing portions have respectively, which correspond to a type indicating portion among the type indicating portions, and each of which moves by making a contact with the type indicating portion when a liquid cartridge is installed on the cartridge installing portions; and a plurality of transmission sections which correspond to the coordinating portions respectively and which move a liquid infusing portion corresponding to the liquid cartridge by transmitting movements of the coordinating portions to the liquid infusing portion.

4. The cartridge installing unit according to claim 3;

wherein each of the transmission sections has a fluid filling chamber and a fluid in the fluid filling chamber; each of the coordinating portions and the liquid infusing portion are connected via the fluid in the fluid filling chamber; and each of the coordinating portions makes a contact with the type indicating portion and pushes the fluid in the fluid filling chamber when the liquid cartridge is installed on the cartridge installing portions.

5. The cartridge installing unit according to claim 3;

wherein each of the transmission sections has a wire; each of the coordinating portions and the liquid infusing portion are connected via the wire; and each of the coordinating portions makes a contact with the type indicating portion and pulls the wire when the liquid cartridge is installed on the cartridge installing portions.

6. The cartridge installing unit according to claim 3, further comprising:

an install inhibiting mechanism, wherein when the liquid cartridge is installed on a cartridge installing portion among the cartridge installing portions, the install inhibiting mechanism inhibits a liquid cartridge of a same type as the liquid cartridge from being installed on the other of the cartridge installing portions.

7. The cartridge installing unit according to claim 6;

wherein when the liquid cartridge is installed on a cartridge installing portion among the cartridge installing portions, the install inhibiting mechanism inhibits the movements of the coordinating portions, of all the cartridge installing portions, which correspond to the type indicating portion of the liquid cartridge which is installed on the cartridge installing portion.

8. The cartridge installing unit according to claim 3;

wherein the cartridge installing unit is configured so that, before the liquid cartridge is completely installed on a cartridge installing portion among the cartridge installing portions, the liquid infusing portion, corresponding to the type indicating portion of the liquid cartridge, reaches the cartridge installing portion.

9. The cartridge installing unit according to claim 8, further comprising:

a movement regulating mechanism which regulates the liquid infusing portion from moving further after the liquid infusing portion has reached the cartridge installing portion; and a plurality of movement allowing mechanisms which allow the movement of the coordinating portion when the movement regulating mechanism regulates the movement of the liquid infusing portion.

10. The cartridge installing unit according to claim 9, further comprising:

a cut-off mechanism which cuts off the transmission of the movement of the coordinating portion to the liquid infusing portion by the transmission section after the liquid infusing portion has reached the cartridge installing portion; and a movement allowing mechanism which allows the movement of the coordinating portion when the cut-off mechanism cuts off the transmission of the movement of the coordinating portion to the liquid infusing portion.

11. The cartridge installing unit according to claim 3;

wherein the same number of the liquid infusing portions and the moving mechanisms as the number of types of the liquid cartridges are provided, and each of the plurality of cartridge installing portions has the number of coordinating portions same as the number of types of the liquid cartridges.

12. The cartridge installing unit according to claim 1, further comprising:

a force applying member which applies a force to the liquid infusing portions toward a predetermined initial position, wherein when the liquid cartridge is installed on the cartridge installing portion, the moving mechanism moves a liquid infusing portion against the force.

13. The cartridge installing unit according to claim 1;

wherein the cartridge installing portions are arranged in a predetermined direction, the liquid infusing portions are arranged in a direction orthogonal to the predetermined direction, and the moving mechanisms move the liquid infusing portions in the predetermined direction.

14. An image recording apparatus which records an image on a recording medium, comprising:

a transporting mechanism which transports the recording medium;

the cartridge installing unit as defined in claim 1; and a liquid discharge head which discharges the liquid supplied from a liquid cartridge, which is installed on the cartridge installing unit, onto the recording medium transported by the transporting apparatus to record the image.

* * * * *